United States Patent [19]

Okumura et al.

[11] Patent Number: 4,640,808

[45] Date of Patent: Feb. 3, 1987

[54] METHOD FOR MAKING MAGNETIC ROLLS

[75] Inventors: Kunio Okumura, Hachioji; Yasuo Fukuyama, Uji; Atsuo Tanaka, Yawata, all of Japan

[73] Assignee: Yamauchi Rubber Industry Co., Ltd., Osaka, Japan

[21] Appl. No.: 692,681

[22] Filed: Jan. 18, 1985

Related U.S. Application Data

[62] Division of Ser. No. 368,998, Apr. 16, 1982, Pat. No. 4,517,719.

[30] Foreign Application Priority Data

Apr. 20, 1981 [JP] Japan .............................. 56-59958
Mar. 12, 1982 [JP] Japan .............................. 57-39916

[51] Int. Cl.[4] .................... B29C 45/14; B29C 67/22; B21B 27/00; G03G 15/09

[52] U.S. Cl. ............................ 264/46.5; 29/116 R; 29/124; 29/125; 29/132; 264/46.7; 264/46.9; 264/261; 264/DIG. 58; 264/DIG. 83; 355/3 DR; 355/3 TR; 355/3 TE; 425/123; 425/543; 425/817 R

[58] Field of Search .................. 264/46.9, 46.5, 45.8, 264/46.2, 46.3, DIG. 58, 261, DIG. 83; 355/3 DR, 3 TR, 3 TE, 14 TR, 110; 29/124, 125, 132, 116 R; 425/543, 817 R, 123

[56] References Cited

U.S. PATENT DOCUMENTS

| | | | |
|---|---|---|---|
| 1,555,389 | 9/1925 | Stevens | 264/46.9 X |
| 3,112,163 | 11/1963 | Alderfer | 264/46.3 X |
| 3,267,484 | 8/1966 | Roedder | 264/46.9 X |
| 3,354,454 | 10/1967 | Nishikawa | 118/658 |
| 3,643,311 | 2/1972 | Knechtel et al. | 29/125 |
| 3,742,852 | 7/1973 | Leffler et al. | 101/378 |
| 3,893,815 | 7/1975 | Drummond, Jr. | 29/132 |
| 3,945,342 | 3/1976 | Drummond, Jr. | 29/132 X |
| 3,945,343 | 3/1976 | Berkowitz | 118/623 |
| 3,978,181 | 8/1976 | Vahle | 264/46.9 X |
| 3,988,816 | 11/1976 | Tada | 29/116 R |
| 4,142,281 | 3/1979 | Müller | 29/132 X |
| 4,186,162 | 1/1980 | Daley | 264/46.5 |
| 4,266,328 | 5/1981 | Harada et al. | 29/116 R |
| 4,293,989 | 10/1981 | Schneider | 29/130 |
| 4,350,750 | 9/1982 | Suzuki et al. | 355/3 DR X |
| 4,357,901 | 11/1982 | Fagen, Jr. et al. | 355/3 DR X |
| 4,415,513 | 11/1983 | Plachy | 264/46.9 X |
| 4,517,719 | 5/1985 | Okumura et al. | 29/124 |
| 4,585,326 | 4/1986 | Okamoto et al. | 355/3 DR X |

FOREIGN PATENT DOCUMENTS

| | | | |
|---|---|---|---|
| 2810405 | 9/1979 | Fed. Rep. of Germany | 355/3 TE |
| 3331428 | 3/1984 | Fed. Rep. of Germany | 355/3 TR |
| 50-707 | 1/1975 | Japan . | |
| 55-100581 | 7/1980 | Japan . | |
| 56-16905 | 2/1981 | Japan . | |
| 57-104163 | 6/1982 | Japan | 355/3 TE |
| 58-106579 | 6/1983 | Japan | 355/3 TE |
| 58-142357 | 8/1983 | Japan | 355/3 TE |
| 58-160970 | 9/1983 | Japan | 355/3 TE |
| 59-114559 | 7/1984 | Japan | 355/3 TR |
| 59-171973 | 9/1984 | Japan | 355/3 TE |
| 2097701 | 11/1982 | United Kingdom | 355/3 TE |
| 2128109 | 4/1984 | United Kingdom | 355/3 TE |
| 2139526 | 11/1984 | United Kingdom | 355/3 TE |

*Primary Examiner*—Philip Anderson
*Attorney, Agent, or Firm*—Stiefel, Gross, Kurland & Pavane

[57] ABSTRACT

Method for making magnetic rolls having a plurality of magnets integrally set fast with a retaining member at stated portions of the periphery of a roll shaft thereby forming a magnetic force generating part, in which the retaining member is made from a rigid synthetic resin or resin foam, and optionally having a strain absorbing groove at a portion outside of said magnetic force generating part are provided.

8 Claims, 10 Drawing Figures

METHOD FOR MAKING MAGNETIC ROLLS

This is a division of application Ser. No. 368,998, filed April 16, 1982 and now U.S. Pat. No. 4,517,719.

BACKGROUND OF THE INVENTION

1. Field of the Invention

This invention relates to a magnetic roll to be used for magnetic brush development mainly in electrostatic recording devices such as copying machines, facsimiles, and printers and to a method for the manufacture of the magnetic roll.

2. Description of the Prior Art

The magnetic brush development in an electrostatic recording system is accomplished by mounting a sleeve of non-magnetic substance on the outer surface of a magnetic roll incorporating permanent magnets, causing a developing agent such as a magnetic toner to adhere to the periphery of the sleeve thereby forming a magnetic brush, then allowing the sleeve to move relative to a photosensitive material thereby causing the produced electrostatic latent image to be rubbed against the photosensitive material.

For the sake of the magnetic brush development described above, there has been conventionally used a magnetic roll which has a plurality of disk retaining flanges fastened to the periphery of a roll shaft and a plurality of bar-shaped sintered ferrite magnets of alternately opposed poles held in position on the retaining flanges.

The magnetic roll of this construction, however, requires a certain level of accuracy with respect to the attachment of the magnets. In the manufacture of this magnetic roll, therefore, particularly the work of attaching the retaining flanges to the roll shaft and the work of attaching the magnets to the retaining flanges a great deal of time and labor is required. Additionally, the fastening of the magnets to the retaining flanges with an adhesive agent is difficult to achieve. The magnetic roll as a whole is complicated in construction, heavy, and difficult to handle. Moreover, it is costly.

Various improvements intended to overcome the disadvantages mentioned above have been proposed. See e.g., Japanese Utility Model Application Disclosure No. 16905/1981, etc. They are, however, not free from varying problems.

Incidentally, Japanese Patent Application Disclosure No. 100581/1980 teaches a magnetic transfer roll having a layer of elastic substance formed on the periphery of a roll shaft and a layer of magnetic substance formed on the periphery of the layer of elastic substance. Since the magnetic transfer roll is required to deform while the magnetic transfer is in process, it necessitates use of the elastic layer which is formed of a soft, resilient substance such as sponge. The flexible, elastic layer, however, is not believed to retain magnets such as sintered magnets in position with high accuracy.

The prior art of this invention further embraces U.S. Pat. No. 3,364,545, U.S. Pat. No. 3,457,618, U.S. Pat. No. 3,945,343, and U.S. Pat. No. 4,155,328, for example.

SUMMARY OF THE INVENTION

An object of this invention is to provide a magnetic roll which is very easy to manufacture and has a very simple construction, giving a solution to the disadvantages suffered by the conventional magnetic rolls.

To be specific, this invention provides a magnetic roll of the type having a plurality of magnets integrally set fast with a retaining member at stated portions of the periphery of a roll shaft thereby forming a magnetic force generating part, which magnetic roll is characterized by having the retaining member in the form of a retaining layer made of rigid sysnthetic resin or rigid synthetic resin foam.

In another aspect, this invention provides a magnetic roll of the type having a plurality of magnets integrally set fast with a retaining member at stated portions of the periphery of a roll shaft thereby forming a magnetic force generating part, which magnetic roll is characterized by having the retaining member in the form of a retaining layer made of rigid synthetic resin or rigid synthetic resin foam and further having a strain absorbing groove formed at a portion outside said magnetic force generating part.

The hardness of the retaining layer is such that the plurality of magnets are prevented from producing positional deviation owing to their mutual attraction and the layer itself keeps its shape intact for a long time. It is suitable to fall in the range of about 40 to about 95, preferably about 50 to about 80, and most preferably about 60 to about 70, on the Short Hardness Scale. The term "Shore hardness" as used herein refers to the values measured by the Shore hardness meter, type D.

Another object of this invention is to provide a method for the manufacture of the magnetic roll described above.

To be specific, this invention further provides a method for the manufacture of a magnetic roll, which method comprises setting a middle metal mold member containing a circular hole on a lower metal mold member provided with a protruding cylindrical base containing a roll shaft insertion hole at the center and a plurality of magnet insertion grooves at stated portions of the periphery thereof, then inserting a roll shaft into said roll shaft insertion hole and, at the same time, inserting magnets into said magnet insertion grooves and setting them upright within said circular hole of said middle metal mold member, subsequently setting an upper metal mold member possessing a protruding cylindrical base substantially similar to said cylindrical base of said lower metal mold member and containing a synthetic resin injection hole on said middle metal mold member and closing these metal mold members tightly, thereafter introducing the raw material of synthetic resin or synthetic resin foam for the production of a retaining layer through said synthetic resin injection hole, allowing the injected raw material to cure and form a retaining layer, and separating the metal mold members thereby obtaining a magnetic roll having the plurality of magnets integrally set fast with the retaining layer made of a rigid synthetic resin or resin foam on the periphery of the roll shaft.

In another aspect, this invention provides a method for the manufacture of a magnetic roll, which method comprises setting a middle metal mold member possessing a circular hole containing magnet retaining grooves at stated portions of the wall thereof on a lower metal mold member provided with a protruding cylindrical base possessing a roll shaft insertion hole at the center thereof, then inserting a roll shaft into said roll shaft insertion hole and, at the same time, inserting magnets into said magnet retaining grooves and setting them upright within said circular hole of said middle metal mold member, subsequently setting an upper metal mold member possessing a protruding cylindrical base substantially similar to said protruding cylindrical base of said lower metal mold member and contaiing a synthetic resin injection hole on said middle metal mold member and closing these metal mold members tightly, thereafter introducing the raw material of synthetic resin or synthetic resin foam for the production of a retaining layer through said synthetic resin injection hole, allowing the injected raw material to cure and form a retaining layer, and separating the metal mold members thereby obtaining a magnetic roll having the plurality of magnets integrally set fast with the retaining layer made of the rigid synthetic resin or resin foam on the periphery of the roll shaft.

One of the characteristics of the magnetic roll of the present invention resides in the fact that the attachment of magnets to the roll shaft is accomplished through the medium of a retaining layer made of a rigid synthetic resin or resin foam. Owing to this particular characteristic, the magnetic roll of this invention is manufactured decisively easily as compared with the conventional magnetic roll and enjoys a notable reduction in weight.

The accuracy with respect to the attachment of magnets is the reason for the lower limit, about 40 of Shore hardness. Above this level, the stability of the attachment of magnets is secured. The upper limit, about 95 of Shore hardness, is desired from some aspects.

Another characteristic of the magnetic roll of the invention resides in the fact that the groove for the absorption of strain is formed in the portion of the retaining layer outside the portion where the magnets are attached to form the magnetic force generating part. Concerning the retention of the magnets, while the aforementioned characteristic provides mechanical stability, the present characteristic serves to ensure thermal stability.

One of the characteristics of the method for the manufacture of this magnetic roll according to the present invention resides in the fact that the production of the retaining layer of synthetic resin or synthetic resin foam is effected by the casting process and, in consequence of the curing of the molten resin or resin foam, the roll shaft, the retaining layer, and the magnets are powerfully set integrally. Since the integration of all these components takes place while the positional relationshp between the roll shaft and the magnets is accurately retained intact within the metal mold, the magnetic roll to be produced will enjoy high dimensional accuracy.

DETAILED DESCRIPTION OF PREFERRED EMBODIMENTS

Figure 1:
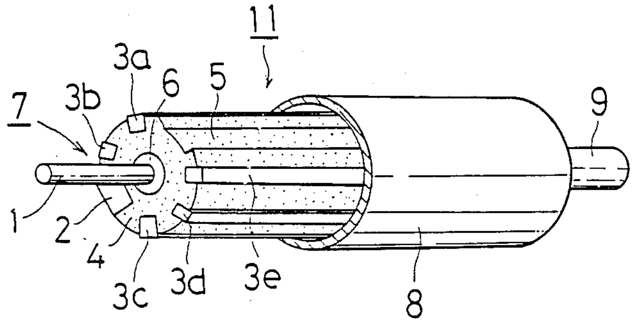
FIG. 1 is a partially cutaway perspective view of a magnetic brush developing roll incorporating one embodiment of the magnetic roll according to this invention.
Figure 2:
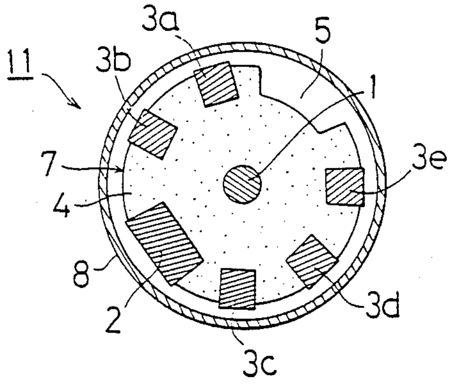
FIG. 2 is a vertical cross section of the same magnetic brush developing roll.
Figure 3:
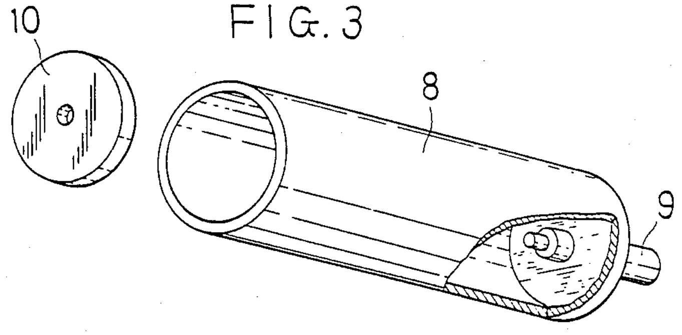
FIG. 3 is a perspective view of a non-magnetic sleeve for use on the magnetic brush developing roll illustrated in FIG. 1.

In FIG. 1, 11 denotes a typical magnetic brush developing roll, which incorporates a typical magnetic roll 7 of the present invention.

For a roll shaft 1, a non-magnetic substance such as aluminum, stainless steel, or synthetic resin and a magnetic substance such as iron, Permalloy, or a mixture of synthetic resin such as with barium ferrite are used. Between the magnetic and non-magnetic substances mentioned above, it is desirable to use the magnetic substance from the standpoint of the formation of a magnetic circuit, specifically from the standpoint of enhancing the coefficient of permeance, diminishing the leakage of magnetic flux, and improving the capacity for magnetizing treatment. The roll shaft may be solid or hollow.

The retaining layer 4 can be formed of thermosetting resins such as epoxy resin, urea resin, phenol resin, unsaturated polyester resin, melamine resin, silicone resin, diallylphthalate resin, and polyurethane resin; thermoplastic resins such as polyolefin, polyethylene, polyvinyl chloride, fluorcarbon resin acrylic resin, polyamide resin, polystyrene, and polycarbonate; thermosetting foams such as epoxy resin foam, urea resin foam, phenol resin foam, silicone resin foam, and polyurethane resin foam; and thermoplastic foams such as polyolefin foam, polyethylene foam, polyvinyl chloride foam, acrylic resin form, polyamide resin foam, and polystyrene foam.

For the sake of weight reduction, it is desirable to use a synthetic resin foam. Particularly in view of the ease of manufacture, it is most desirable to form the retaining layer 4 with a polyurethane foam by the reaction injection molding process (hereinafter referred to as RIM foam urethane).

When the retaining layer 4 is formed of a synthetic resin foam, the expansion ratio is suitably selected within the range of 1.2 to 3.5.

When the expansion ratio is less than 1.2, much of the synthetic resin foam material is required and the retaining layer formed thereby is not desired from the viewpoint of thermal deformation. While if the expansion rate is greater than 3.5, the formed retaining layer would not be so strong because it has more voids. Particularly from the standpoint of strength and thermal strain, the expansion ratio is desired to fall in the range of 1.8 to 2.5.

Selection of the epoxy resin, the polyester resin, etc. for the retaining layer 4 proves advantageous in respect that the retaining layer 4 can be formed under atmospheric pressure.

In the retaining layer 4, magnets 2, 3a–3e are set fast in position. If the magnets 2, 3a–3e are caused to experience any positional deviation, then the copying properties of the magnetic brush developing roll will be adversely affected. For this reason, the accuracy with which the magnets 2, 3a–3e are attached to the retaining layer 4 is important. In this respect, use of a soft synthetic resin or synthetic resin foam as the material for the retaining layer 4 should be avoided. Since the plurality of magnets 2, 3a–3e have a strong magentic force and they are disposed in parallel with their opposite poles alternatively arranged, power attraction is exerted at all times on these magnets. If the retaining layer 4 is made of a material abounding with elasticity, therefore, the retaining layer 4 is gradually deformed by the aforementioned attracting force and the positions at which the magnets 2, 3a–3e are disposed are accordingly changed. As the result, the developer attracting property is affected and the copying property is adversely affected. From this point of view, an elastic material which is readily deformed should not be adopted as the material for the retaining layer 4. The material to be selected, therefore, is desired to have at least about 40 of Shore hardness.

Figure 9:
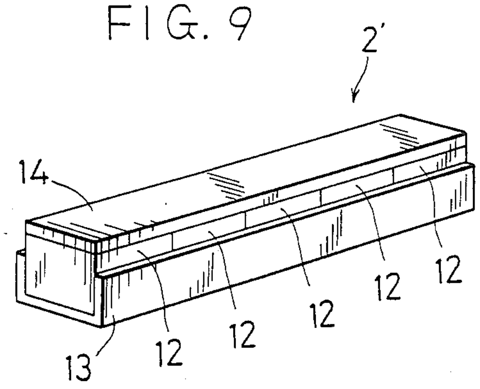
FIG. 9 is a perspective view of an integrated series of short magnets useful for the manufacture of the magnetic roll of the present invention.

The magnets 2, 3a–3e include a magnet 2 for attracting the developing agent and such as a magnetic toner and magnets 3a–3e for retaining the attracted developing agent. As the magnet 2 for the attraction of the developing agent, a bar-shaped sintered ferrite magnet, alnico magnet, or rare earth magnet having powerful magnetic force can be used. When necessary, a keeper of magnetic substance to be used for forming a magnetic circuit may be disposed on the rear side of this magnet 2. As the magnets 3a–3e for the retention of the attracted developing agent such as a magnetic toner, bar-shaped ferrite magnets similar to the magnet 2 for the attraction of the developing agent, or plate-shaped ferrite magnets or sheet-shaped composite magnets can be used. Although a long one-piece sintered magnet is advantageously used as the bar-shaped sintered magnet, a combined magnet 2′ which is formed by having a plurality of short sintered magnets 12 held in position within a trough-shaped holder 13 of non-magnetic substance and a sheet-shaped composite magnet 14, for example, mounted on the upper surface of the short sintered magnets as illustrated in FIG. 9 may be economically used. The sheet-shaped composite magnet 14 is used here for the purpose of compensating the lowering of magnetic force between the short sintered magnets. In this case, the upper surface of the sheet-shaped composite magnet 14 constitutes itself part of the peripheral surface of the magnetic roll 7. The sheet-shaped composite magnet 14 is made, for example, of elastic rubber component and magnetic substance component in accordance with the conventional manner. The combination of the plurality of short sintered magnets 12 may be effected by use of an adhesive agent instead of the holder 13.

The expression "stated portions" of the retaining layer 4 at which the magnets 2, 3a–3e are set fast is used to refer to part of the peripheral surface and not the entire peripheral surface of the retaining layer 4. In the part of the peripheral surface, the magnets 2, 3a–3e are set fast integrally in the retaining layer 4 in such an arrangement that the developing agent such as a magnetic toner will be attracted and uniformly retained. The arrangement of magnets which is well known in the art can be suitably used for effective arrangement of the magnets 2, 3a–3e.

The portions in which the magnets 2, 3a–3e are set fast in the retaining layer form a magnetic force generating part, which functions to attract and retain the magnetic toner, for example.

In a portion of the retaining layer outside the magnetic force generating part, there is formed a groove 5 for the absorption of strain instead of a magnet. No magnet is provided in this particular portion because no magnetic force is required in recovering the residual magnetic toner which has escaped being used for the development. The groove 5 for the absorption of strain is provided here for the purpose of precluding the phenomenon that the roll is bent by the difference in thermal strain between the magnetic force generating part incorporating the magnets 3a–3e and the part incorporating no magnet and the phenomenon that the retaining layer 4 and the magnets 2, 3a–3e separate from each other along their interface.

The shape, width, depth, etc. of the groove 5 are determined by the use to be found for this invention, the diameter of roll, the thickness of the retaining layer 4, etc. A typical groove has a cross section of the shape of the letter U of a shallow bottom and is disposed in the axial direction. In other word, the grooves to be cited afterward in the embodiments may be suitably modified in shape, width, and depth. The groove 5 is not limited to the cited shapes and sizes. It is only required to possess shape, width, and depth such that the difference of thermal deformation between the synthetic resin or synthetic resin foam of the retaining layer 4 and the magnets (normally sintered magnets) 2, 3a–3e, i.e. the two different materials is absorbed.

Generally, only one groove 5 suffices. Optionally, two or more such grooves may be incorporated.

By 6 is denoted a slider.

Denoted by 8 is a non-magnetic sleeve made of such a material as aluminum or stainless steel, and it is concentrically set on the periphery of a magnetic roll 7.

By 9 is denoted a rotary shaft and by 10 a lid plate.

As is plain from the description given above, the magnetic roll 7 comprises a plurality of magnets 2, 3a–3e set fast in stated portions of the roll shaft 1 with a retaining layer 4 having a Shore hardness of about 40 to about 95 and a groove 5 for the absorption of thermal strain formed in a portion of the retaining layer outside the aforementioned stated portions. Compared with the conventional magnetic roll which uses disk retaining flanges, the magnetic roll 7 of the embodiment can be manufactured decisively easily and less expensively and can be used effectively in a wider range of temperatures (as between −25° C. and +70° C., for example). In other words, the magnetic roll 7 can be operated in a wide range of temperatures without generating any warp or bend. When this magnetic roll 7 is used in the magnetic brush developing roll 11, the uniformity of the magnetic force on the periphery of the sleeve 8 and consequently the copying ability can be retained at high levels because the gap between the periphery of the roll 7 and the non-magnetic sleeve 8 mounted concentrically on the periphery of the roll 7 can be minimized to the fullest possible extent.

Typically, the components which make up the magnetic roll 7 and the sizes of such components are as follows.

Roll shaft 1, made of iron and measuring 8 mm in diameter and 334 mm in length.

Magnet 2, sintered ferrite magnet measuring 12 mm×12 mm×292 mm.

Magnets 3*b* and 3*c*, sintered ferrite magnets measuring 6 mm×6 mm×292 mm.

Magnets 3*a*, 3*d*, 3*e*, rubber magnets measuring 6 mm×6 mm×292 mm.

Retaining layer 4, made of polyurethane foam (formed by the reaction injection molding process), having an expansion ratio of 2.5 and Shore hardness of 67, and measuring 47 mm in outside diameter and 292 mm in length.

Groove 5, having a cross section of the shape of the letter U, and measuring 28 mm in width ×8.5 mm in depth ×292 mm in length.

Figure 4:
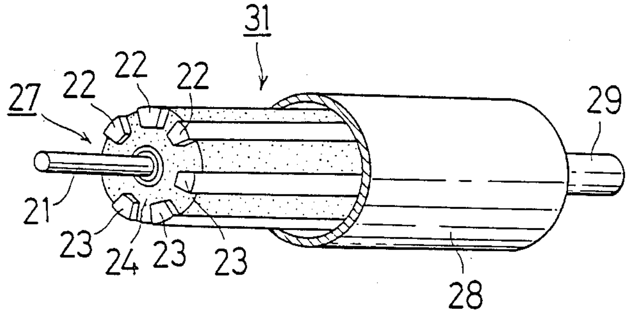
FIG. 4 is a diagram illustrating, similarly to FIG. 1, a magnetic brush developing roll incorporating another embodiment of the magnetic roll according to the present invention.

In the diagram of FIG. 4, 27 denotes another embodiment of the magnetic roll of the present invention. This magnetic roll 27 comprises a roll shaft 21, a plurality of anisotropic bar-shaped magnets 22 for attracting the magnetic toner, a plurality of anisotropic bar-shaped magnets 23 for retaining the attracted magnetic toner, and a retaining layer 24 of foamed urethane for integrally retaining such magnets in position. Unlike the magnetic roll of the preceding embodiment, the magnetic roll in this embodiment has no groove formed therein.

On the periphery of this magnetic roll 27, a sleeve 28 of non-magnetic substance (aluminum) having a coarse surface and provided at one end thereof with a rotary shaft 29 is concentrically mounted, to complete a magnetic brush developing roll 31.

Figure 5:
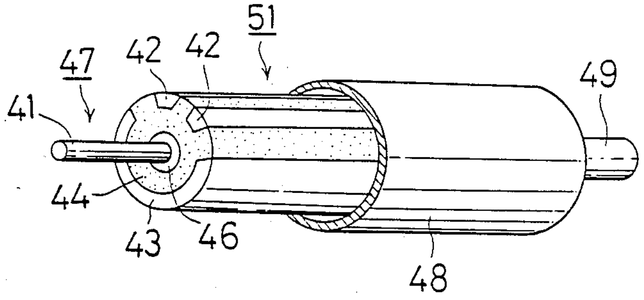
FIG. 5 is a diagram illustrating, similarly to FIG. 1, a magnetic brush developing roll incorporating yet another embodiment of the magnetic roll according the present invention.

In the diagram of FIG. 5, 47 denotes yet another embodiment of the magnetic roll of this invention. This magnetic roll 47 comprises a roll shaft 41, anisotropic bar-shaped magnets 42 for attracting the magnetic toner, an anisotropic sheet-shaped semicylindrical magnet 43 for retaining the attracted magnetic toner, and a retaining layer 44 of epoxy resin for integrally retaining such magnets in position.

On the periphery of this magnetic roll 47, a sleeve 48 of non-magnetic substance (aluminum) having a coarse surface and provided at one end thereof with a rotary shaft 49 is concentrically mounted, to complete a magnetic brush developing roll 51.

Figure 6:
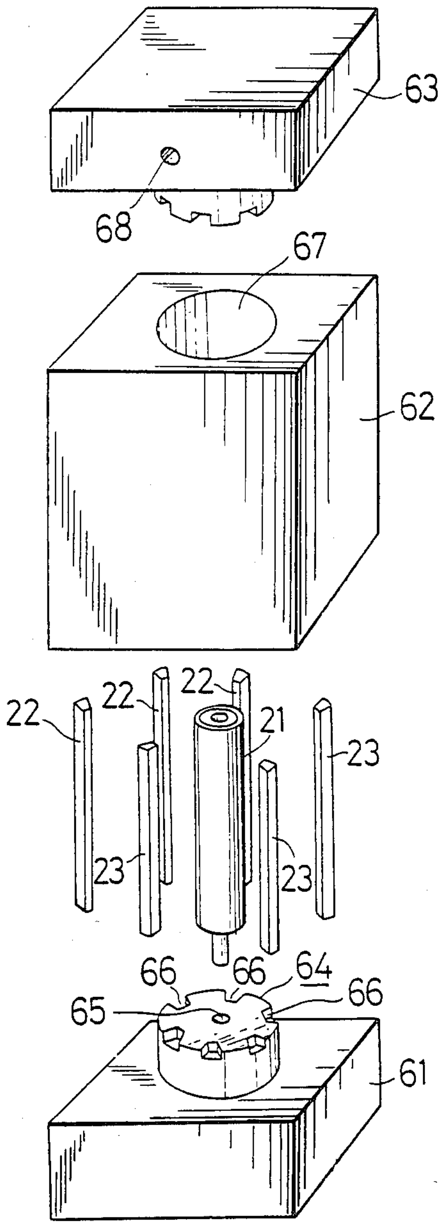
FIG. 6 is an exploded perspective view of metal molds and relevant parts, illustrating the condition in which the magnetic roll shown in FIG. 4 is manufactured.
Figure 7:
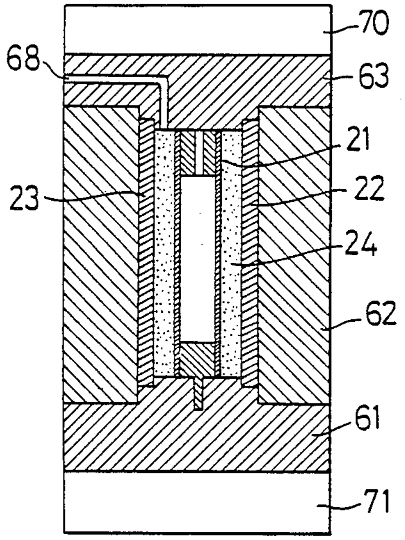
FIG. 7 is a vertical cross section of metal molds and relevant parts, illustrating the condition in which synthetic resin has been introduced into the cavity of the mold.

Now, the method for the manufacture of the aforementioned magnetic roll 27 will be described with reference to FIG. 6 and FIG. 7.

(i) A middle metal mold member 62 is mounted on a lower metal mold member 61.

(ii) The roll shaft 21 having adhesive agent applied thereto is inserted into a roll shaft insertion hole 65 in a protruding cylindrical base 64 of the lower metal mold member 61 and raised upright inside a circular hole 67 of the middle metal mold member 62.

(iii) Then, the anisotropic bar-shaped magnets 22, 23 are inserted respectively into the magnet insertion grooves 66 formed in the base 64 of the lower metal mold member 61 and raised upright, similarly to the roll shaft 21, within the circular hole 67 of the middle metal mold member 62.

(iv) An upper metal mold member 63 is placed on top of the middle metal mold member 62, and all the metal mold members are closed tightly by means of a press 70, 71.

(v) Subsequently, the raw materials for RIM foam urethane, namely, (1) 100 parts by weight of polyol (made by Sumitomo Bayer Urethane Ltd. and marketed under trademark designation of Desmophen B631).

(2) 110 parts by weight of isocyanate (made by the same company as described above and marketed under trademark designation of Desmodur 44 V20), and (3) 12 parts by weight of a foaming agent (made by Mitsui-Fluoro Chemical Ltd., and marketed under trademark designation of Freon 11)

are mixed and injected by a high-pressure reaction injector through an injection hole 68 of the upper metal mold member 63. The liquid mixture in the mold is heated at 60° C. for 10 minutes to be cured. Thereafter, the upper metal mold member 63, the middle metal mold 62, and the lower metal mold member 61 are opened to release a magnetic roll 27 having the magnets 22, 23 retained at the stated positions to the roll shaft by means of a RIM foam urethane layer 24 of Shore Hardness 60.

By concentrically inserting the magnetic roll 27 thus produced into the interior of the aluminum sleeve 28 and then fitting the lid plate in position, there is obtained a magnetic brush developing roll 31.

Figure 8:
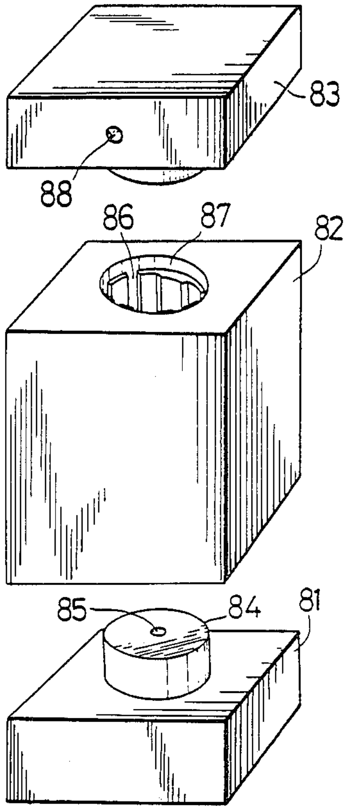
FIG. 8 is an exploded perspective view of a metal mold to be used for the manufacture of the magnetic roll shown in FIG. 1.

The magnetic roll 7 illustrated in FIG. 1 and the magnetic roll 47 illustrated in FIG. 5 are manufactured by the same procedure as described above. It is provided, however, that the shape of closed metal mold members to be used may be suitably changed. For the magnetic roll 7, for example, such metal mold members 81, 82, 83 as illustrated in FIG. 8 are used. The materials for synthetic resin and the method for curing the synthetic resin may be modified. For the magnetic roll 47, for example, an epoxy resin solution (mixture of 100 parts by weight of Araldite GY-252 and 23 parts by weight of HY 2962, curing agent, both made by Ciba Geigy Japan Ltd.) is used. This mixture is injected into the closed metal mold and then cured by being heated at 60° C. for 40 minutes.

In FIG. 8, 84 denotes a protruding base 85 on the lower metal mold member circular hole in the based for erecting a roll shaft, 87 a circular hole of the middle metal mold member, 86 grooves for retaiing magnets, and 88 an injection hole in the upper metal mold member.

Figure 10:
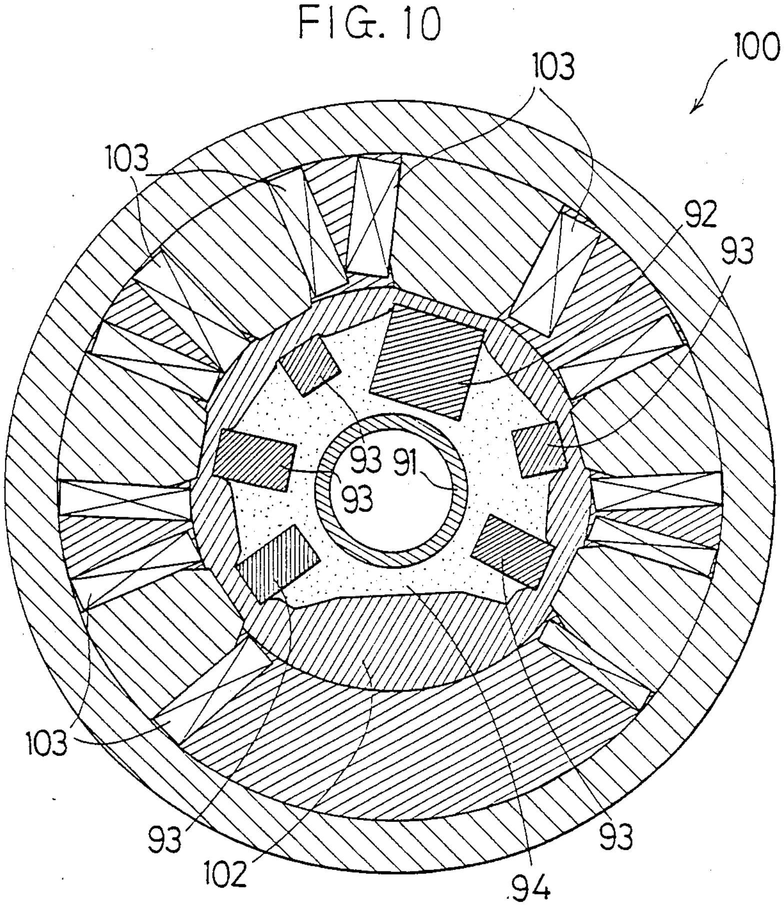
FIG. 10 is a cross section of a metal mold serving concurrently for molding and magnetization.

In the method for the manufacture of the magnetic roll described above, the magnets may be used in a form magnetized in advance. Otherwise, they may be set fast to the roll in a form not yet magnetized. After the retaining layer has been cured, the roll now complete integrally with the magnets and the retaining layer is removed from the metal mold, set in position with a magnetizing metal mold and subjected to magnetization, to produce a complete magnetic roll. It is likewise possible to use the metal mold illustrated in FIG. 10. In this case, the magnets 92, 93 in a state not yet magnetized can be magnetized within the metal mold 100 immediately after the retaining layer 94 has been cured therein. In FIG. 10, 91 is a roll shaft, 102 is a nitrided mold member and 103 is a magnetizing coil.

What is claimed is:

1. A method for the manufacture of a magnetic roll having a rigid synthetic resin or synthetic resin foam retaining layer and individual spaced-apart magnets arranged and held fast around the periphery thereof, comprising the steps of:

(a) mounting a middle mold member, having a cylindrical bore, on a lower mold member provided with a protruding cylindrical base containing a roll shaft insertion hole at the center thereof and spaced-apart magnet insertion grooves around the periphery thereof;

(b) inserting a roll shaft into said roll shaft insertion hole, while inserting said individual magnets into said magnet insertion grooves and setting the magnets upright within the circular bore of said middle mold member;

(c) placing an upper mold member, having a protruding cylindrical base with spaced apart magnet insertion grooves around the periphery thereof and a synthetic resin injection hole, on said middle mold member while inserting said magnets in said magnetic insertion grooves of said upper mold to retain said magnets in predetermined positions;

(d) assembling said upper, lower and middle mold members to form a closed mold;

(e) introducing a synthetic resin or synthetic resin foam, which is formulated to provide a rigid finished retaining layer of at least 40 Shore hardness, into said mold through the synthetic resin injection hole;

(f) curing or solidifying the synthetic resin or synthetic resin foam introduced into the closed mold in step (e) to provide said rigid finished retaining layer of at least 40 Shore hardness; and (g) separating the mold members to obtain said magnetic roll.

2. A method for the manufacture of a magnetic roll having a rigid synthetic resin or synthetic resin foam retaining layer and individual spaced-apart magnets arranged and held fast around the periphery thereof, comprising the steps of:

(a) mounting a middle mold member, having a cylindrical bore with magnet insertion grooves therein, on a lower mold member provided with a protruding cylindrical base containing a roll shaft insertion hole at the center thereof;

(b) inserting a roll shaft into said roll shaft insertion hole, while inserting said magnets into said magnet retaining grooves and setting said magnets upright within the circular bore of said middle mold member;

(c) placing an upper mold member, having a protruding cylindrical base with a synthetic resin injection hole, on said middle mold member;

(d) assembling said upper, lower and middle mold members to form a closed mold;

(e) introducing a synthetic resin or synthetic resin foam which is formulated to provide a rigid finished retaining layer of at least 40 Shore hardness into said mold through the synthetic resin injection hole;

(f) curing or solidifying the synthetic resin or synthetic resin foam introduced into the closed mold in step (e) to provide said rigid finished retaining layer of at least 40 Shore hardness; and (g) separating the mold members to obtain said magnetic roll.

3. The method according to claim 1, wherein the middle mold member has a groove forming portion for forming a strain absorbing groove in the retaining layer of the magnetic roll.

4. The method according to claim 2, wherein the middle mold member has a groove forming portion for forming a strain absorbing groove in the retaining layer of the magnetic roll.

5. A method according to claim 1 or 2, wherein the synthetic resin foam material for the production of a retaining layer comprises an isocyanate, a polyol, and a foaming agent and these compounds are mixed in advance in a high-pressure or low-pressure reaction injector and used in the form of a liquid reaction mixture.

6. A method according to claim 1 or 2, wherein the magnets are in a state not yet magnetized when they are inserted into the metal mold and, after the retaining layer has been cured, they are magnetized.

7. A method according to claim 6, wherein the roll shaft is made of a magnetic substance.

8. A method according to claim 7, wherein the metal mold is provided with magnetizing means and the magnets held in a state not yet magnetized are magnetized within the metal mold immediately after the retaining layer has been cured.

* * * * *